Figure 4:
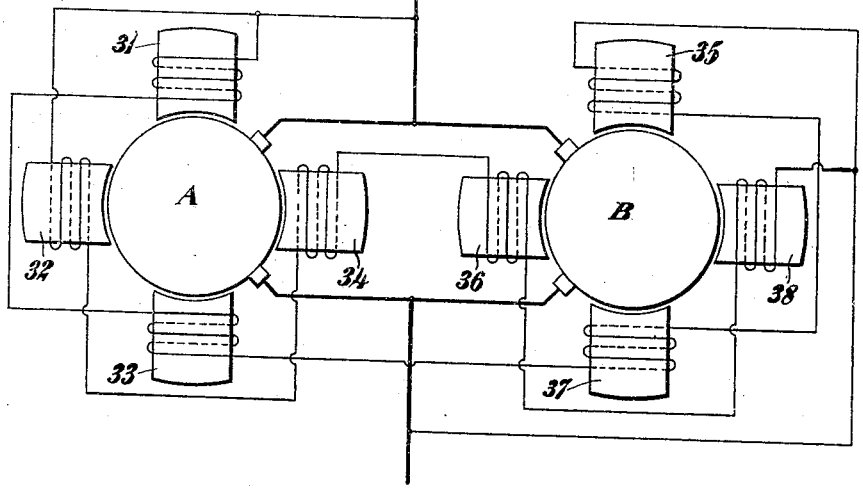

B. FRANKENFIELD.
SYSTEM OF ELECTRICAL DISTRIBUTION.
APPLICATION FILED MAR. 30, 1907.
931,404.
Patented Aug. 17, 1909.
2 SHEETS—SHEET 1.
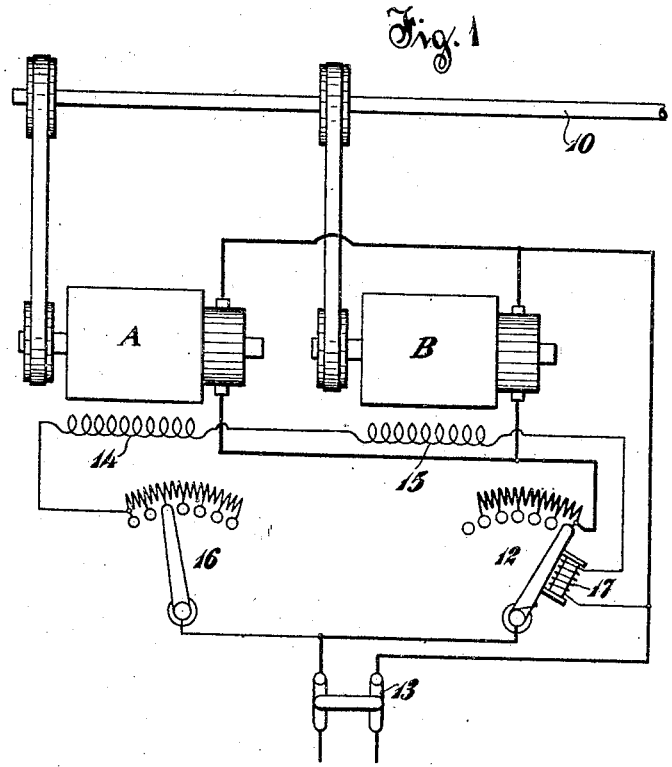
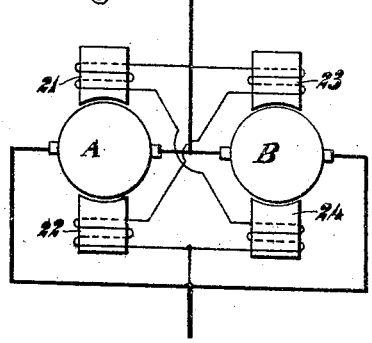
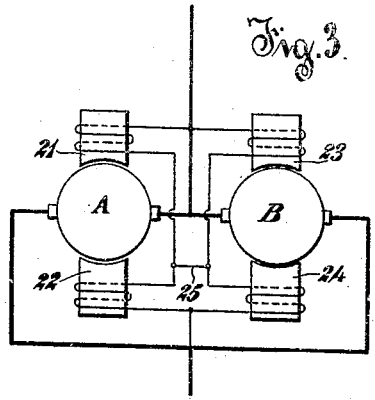
Witnesses
Inventor
Budd Frankenfield
By
Chas. E. Lord
Attorney

UNITED STATES PATENT OFFICE.

BUDD FRANKENFIELD, OF NORWOOD, OHIO, ASSIGNOR TO ALLIS-CHALMERS COMPANY, A CORPORATION OF NEW JERSEY, AND TO THE BULLOCK ELECTRIC MANUFACTURING COMPANY, A CORPORATION OF OHIO.

SYSTEM OF ELECTRICAL DISTRIBUTION.

No. 931,404.   Specification of Letters Patent.   Patented Aug. 17, 1909.

Application filed March 30, 1907. Serial No. 365,460.

*To all whom it may concern:*

Be it known that I, BUDD FRANKENFIELD, a citizen of the United States, residing at Norwood, in the county of Hamilton and State of Ohio, have invented certain new and useful Improvements in Systems of Electrical Distribution, of which the following is a full, clear, and exact specification.

My invention relates to systems of electrical distribution in which a plurality of motors having shunt-field windings are mechanically connected to drive a common load.

If two or more shunt-wound motors are mechanically connected to a common load, they should divide the load in proportion to their respective capacities. It is found in practice however that if the motors are independently connected to the line this division of the load is unstable, and any slight difference in the temperatures of the motors, especially in the temperatures of their field magnets, causes a non-proportional division of the load, even when the speed regulation curves of the motors are normally similar. As a result of this, one of the motors will soon be carrying an undue share of the load.

It is the object of my present invention to provide such electrical connections for shunt motors mechanically connected to a common load that they will divide the load in proportion to their capacities, and that this division of the load will be stable, regardless of inequalities in the temperatures of the different motors.

My invention therefore broadly comprises a plurality of motors mechanically connected to a common load, and a shunt field winding for each of said motors connected in series with a shunt field winding of another of said motors.

In applying my invention to standard shunt motors in which the field of each motor is wound for the full line voltage, a number of specifically different systems of connections may be used, the essential feature being that each magnetic circuit of the fields of the motors is provided with a shunt winding connected in series with a shunt field winding of another of said motors. It will generally be advantageous to have the shunt field coils on adjacent field poles in different electric circuits.

Other features of my invention will appear from the description and drawings and will be particularly pointed out in the claims.

Figure 1 shows two motors mechanically connected to a common load and electrically connected in accordance with my invention so that the motors will divide the load in proportion to their capacities; Figs. 2, 3, 4 and 5 show modifications of the system of connections.

The two motor armatures A and B shown in Fig. 1 may be mechanically connected to a common load in any desired manner, as for instance by being on a common shaft, by having their shafts directly coupled, or by being connected by belts, gears, chains or ropes to the load, here represented by a shaft 10. The two armatures A and B are connected in shunt to each other and are started by a common starting box 12, through which and a switch 13 they are connected to the common source of current supply. The shunt field windings 14 and 15 of the two motors respectively are connected in series with each other across the line, and are adjustable in strength by the common field rheostat 16. The no-voltage release magnet 17 of the starting rheostat 12 may also be in series with the motor shunt field windings as shown.

Upon closing the switch 13 and moving the arm of the starting box 12 to the right, the motors A and B and their common load will be started. By adjusting the rheostat 16, any desired speed may be obtained within the limits of speed variation of the motors. Should the motors be operated under different conditions, at different temperatures for instance, any change in the field resistance of one varies the field strengths of the two machines correspondingly. This prevents either motor from taking more than its share of the load, as would be the case if the motors were independently connected to the line and the field winding of one became hotter and therefore, because of its increased resistance, weaker than the field winding of the other motor. In the same way any other difference in the conditions under which the motors operate does not cause a non-proportional division of the load, because any electrical change in the field of the one is accompanied by a corresponding change in the field of the other. In the arrangement shown in Fig. 1, however, each of the shunt field windings 14 and 15 has impressed thereon only a part of the line voltage, thus requiring the fields of these motors to be specially wound. In the other figures I have shown arrangements in which the same advantages are obtained as in Fig. 1, while in addition standard motors may be used without requiring any change in their field windings. In these other figures the various regulating rheostats and the mechanical connections between the motors and its common load are omitted for the sake of simplicity in the drawings, although in practice they would be necessary.

In Fig. 2 the armatures A and B of two motors are connected in shunt to each other. These two motors are bipolar motors having field poles 21 and 22, and 23 and 24, respectively. The windings on the poles 21 and 24 are connected in series, while the windings on the poles 22 and 23 are likewise connected in series, these two circuits being in shunt to each other and to the armatures. If the motors have like field windings the resistance of each of these shunt field circuits is the same as that which the field windings of a single motor separately connected in series would have.

With the arrangement of Fig. 2, any change in the conditions under which one motor operates causes corresponding electromagnetic variations in the two motors. Thus any increase in the temperature of the left-hand motor increases the resistance of the field windings on the poles 21 and 22, and this increase in resistance, while it decreases the current in said windings, correspondingly decreases the current in the windings 24 and 23 respectively. If only one of the field coils, say on pole 21, changes in resistance the magnetic circuits of both motors are still correspondingly affected.

In Fig. 3 the armatures A and B of two bipolar motors are connected in shunt to each other while the entire shunt field winding of each machine is connected directly across the line. At points between the windings on the field poles 21 and 22, and those on field poles 23 and 24, there is a cross connection 25 between the two field windings.

The arrangement shown in Fig. 3 may be used to greater advantage where the resistances of different parts of the field windings of the motors may be unlike. Thus any variation in the current in the field winding on the pole 21 for instance is divided between the windings on the poles 22 and 24. This arrangement is not as efficacious as the arrangement of Fig. 2 even in this special case, but may sometimes be found desirable. Similar cross connections 25 may be applied to any number of motors having any number of poles.

In Fig. 4 the two armatures A and B of two four-pole motors are connected in shunt to each other. These motors have poles 31, 32, 33 and 34, and 35, 36, 37 and 38, respectively. The windings on poles 31, 33, 37 and 35 are connected in series, while the windings on poles 32, 34, 36, and 38 are likewise connected in series. These two circuits are connected in shunt to each other and to the armatures, and if the motors have like field coils each of said circuits has the same resistance as a circuit comprising the windings on the four poles of either machine would have. The windings on alternate poles of each machine are thus connected in series, while the windings on adjacent poles are in different circuits. Thus any change in the resistance of the field coils of either motor causes corresponding changes in the field currents of both motors in substantially the same manner as described in connection with Fig. 1.

Figure 5:
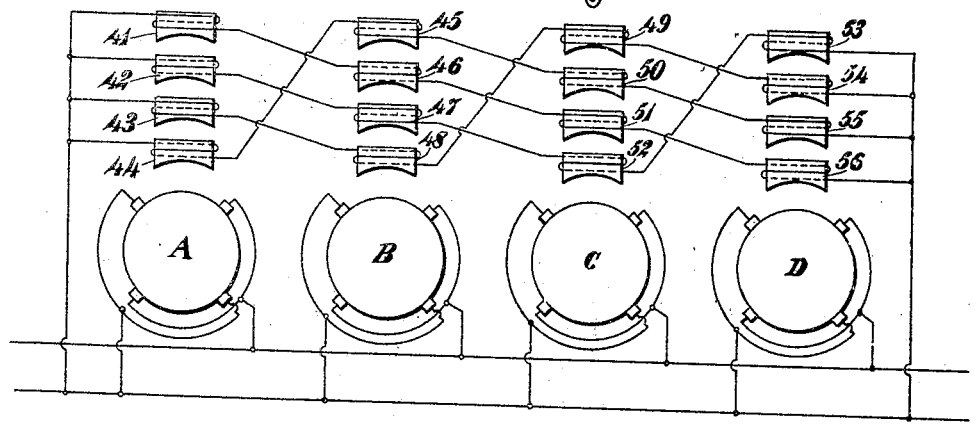

In Fig. 5, four-pole motors A, B, C and D are shown, the field-poles of these motors being all shown above their respective armatures for the sake of simplicity of the drawings instead of being shown in their proper places distributed around the armatures. The field coils on the poles 41, 46, 51, and 56, are connected in series in one circuit, the coils on the poles 42, 47, 52, and 53 in series in another circuit, the coils on the poles 43, 48, 49 and 54 in series in a third circuit, and the coils on the poles 44, 45, 50 and 55 in series in still another circuit. These four circuits are in shunt to one another and to the armatures. In each of these shunt field circuits the resistance is the same as the resistance which the field coils of a single motor connected in series would have provided the motors have like field windings.

Any change in the conditions under which one motor operates causes corresponding variations in the field currents in all of the motors, while if only one field-pole of one machine becomes heated and its coil therefore has an increased resistance, the field current in one pole of each motor will be correspondingly cut down. It is generally immaterial whether the coils which are in series are on like or unlike poles of the different motors, the former arrangement being shown in Fig. 4 and for the motors A and C or B and D of Fig. 5, while the latter arrangement is shown in Fig. 2 and for the motors A and B or C and D of Fig. 5. In all cases each motor has a shunt field winding which is connected in series with a shunt field winding on each other motor, and moreover each magnetic circuit of the fields of the motors has at least one exciting winding, and generally two, connected in series with a shunt field winding on another motor. In the preferred arrangements for standard motors the field windings on adjacent poles of each machine are in different circuits, and when multipolar motors are used the windings of alternate poles are preferably in the same circuit.

In the above description of the several modifications, the statements which compare resistances are made with reference to motors having like field coils, to show that standard motors may then be used without any change. If the motors have unlike field coils the same systems of connections can be used with the same results, but generally the field windings of the different motors would have to be proportioned for the same currents at different voltages.

Many modifications in the precise arrangements here shown and described may be made without departing from the spirit and scope of my invention, and all modifications which involve the principle of my invention I aim to cover in the following claims.

What I claim as new is:—

1. In combination, a plurality of motors mechanically connected to rotate at substantially proportional speeds and to drive a common load and having their armatures connected in parallel, and a shunt field winding for each of said motors connected in series with a shunt field winding of another of said motors.

2. In combination, a plurality of motors mechanically connected to rotate at substantially proportional speeds and to drive a common load and having their armatures connected in parallel, a shunt field winding for each of said motors connected in series with a shunt field winding of another of said motors, and a common regulating means for said field windings.

3. In combination, a plurality of motors mechanically connected to a common load and having their armatures connected in parallel, a shunt field winding for each of said motors connected in series with a shunt field winding of another of said motors, a common starting means for the motors, and a common regulating means for said field windings.

4. In combination, a plurality of motors, and shunt field windings for said motors, the shunt field windings on adjacent poles of each machine being connected in separate circuits and each in series with a shunt field winding on another of said motors.

5. In combination, a plurality of motors, and shunt field windings for said motors, the shunt field windings on alternate poles being connected in different circuits and each being in series with a field winding on another of said motors.

6. In combination, a plurality of motors, and shunt field windings for said motors, the shunt field windings on alternate poles being connected in different circuits and each being in series with a field winding on alternate poles of another of said motors.

7. In combination, a plurality of motors, and shunt field windings for said motors, the shunt field windings on field poles of different polarity on any one motor being in different circuits.

8. In combination, a plurality of motors, and shunt field windings for said motors, the shunt field windings on field poles of different polarity on any one motor being in different circuits and each in series with a shunt field winding on one of the other motors.

9. In combination, a plurality of motors, and shunt field windings for said motors, the shunt field windings on field poles of different polarity on any one motor being in different circuits and on field poles of like polarity on any one motor in the same circuit.

10. In combination, a plurality of motors, and shunt field windings for said motors, the shunt field windings on field poles of different polarity on any one motor being in different circuits and on field poles of like polarity on any one motor in the same circuit, the field winding on each pole of each motor being in series with a field winding on another of said motors.

11. In combination, a plurality of motors, and a plurality of shunt field circuits therefor equal in number to the number of motors and each including a field winding on each motor.

12. In combination, a plurality of motors, and a plurality of shunt field circuits therefor equal in number to the number of motors and each including the winding on one field pole of each of said motors.

13. In combination, a plurality of motors, and a plurality of shunt field circuits therefor equal in number to the number of motors, each of said shunt field circuits including shunt field windings on two of said motors.

14. In combination, a plurality of motors connected to a common load and having their armatures connected in parallel, each magnetic circuit of the fields of the motors being excited by a shunt field winding connected in series with a shunt field winding of another of said motors.

15. In combination, a plurality of motors, and a plurality of shunt field circuits therefor, each magnetic circuit of the fields of the motors being excited by at least two shunt field windings in different ones of said shunt field circuits, and each of said shunt field circuits comprising field windings on at least two of the motors.

16. In combination, a plurality of motors having their corresponding armature terminals directly connected, a shunt field winding for each of said motors connected in series with a shunt field winding of another of said motors, a common starting means for the motors, and a common regulating means for said field windings.

17. In combination, a plurality of motors mechanically connected to rotate at substantially proportional speeds and to drive a common load and having their armatures connected in parallel, a shunt field winding for each of said motors connected in series with a shunt field winding of another of said
5 motors, a common starting means for the motors, and a common regulating means for said field windings.

18. In combination, a plurality of motors mechanically connected to a common load
10 and having their armatures connected in parallel, a shunt field winding for each of said motors connected in series with a shunt field winding of another of said motors, and unitary means for regulating said two field windings correspondingly. 15

In testimony whereof I affix my signature, in the presence of two witnesses.

BUDD FRANKENFIELD.

Witnesses:
 GEO. B. SCHLEY,
 FRED J. KINSEY.